US006263834B1

(12) United States Patent
Igual De Valles

(10) Patent No.: US 6,263,834 B1
(45) Date of Patent: Jul. 24, 2001

(54) SANITARY DEVICE FOR THE DEPOSITION OF DOMESTIC ANIMALS EXCREMENTS

(76) Inventor: Pilar Igual De Valles, 182, calle Casanova, 08036 Barcelona (ES)

( * ) Notice: Subject to any disclaimer, the term of this patent is extended or adjusted under 35 U.S.C. 154(b) by 0 days.

(21) Appl. No.: 09/486,088
(22) PCT Filed: Aug. 26, 1998
(86) PCT No.: PCT/ES98/00235
  § 371 Date: Feb. 22, 2000
  § 102(e) Date: Feb. 22, 2000
(87) PCT Pub. No.: WO99/11116
  PCT Pub. Date: Mar. 11, 1999

(30) Foreign Application Priority Data

Aug. 29, 1997 (ES) .................................. 9702264 U

(51) Int. Cl.⁷ .................................................. A01K 29/00
(52) U.S. Cl. ............................................ 119/166; 119/161
(58) Field of Search .................................. 119/161, 165, 119/166, 168; 294/1.3, 1.4; A01K 29/00

(56) References Cited

U.S. PATENT DOCUMENTS

| | | | |
|---|---|---|---|
| 3,793,987 | * | 2/1974 | Rogers ................................. 119/161 |
| 3,817,213 | * | 6/1974 | Chalmers ............................. 119/161 |
| 3,921,582 | * | 11/1975 | Sedlmeir ............................. 119/161 |
| 4,196,693 | | 4/1980 | Unversaw . |
| 4,527,511 | * | 7/1985 | Richards ............................. 119/161 |
| 4,593,645 | * | 6/1986 | Dingler ............................... 119/165 |
| 5,044,325 | * | 9/1991 | Miksitz ............................... 119/165 |
| 5,458,090 | | 10/1995 | Favreau . |
| 5,494,001 | * | 2/1996 | Leibowitz ........................... 119/163 |
| 5,996,533 | * | 12/1999 | Gordon ............................... 119/166 |

FOREIGN PATENT DOCUMENTS

| | | | |
|---|---|---|---|
| 3943363 | * | 6/1990 | (DE) ..................................... 119/161 |
| 2630295 | * | 10/1989 | (FR) ..................................... 119/161 |
| 79/00458 | * | 7/1979 | (WO) ................................... 119/161 |
| 94/06277 | * | 3/1994 | (WO) ................................... 119/161 |
| WO9801374 | | 1/1998 | (WO) . |

* cited by examiner

Primary Examiner—Peter M. Poon
Assistant Examiner—Son T. Nguyen
(74) Attorney, Agent, or Firm—Sughrue, Mion, Zinn Macpeak & Seas, PLLC

(57) ABSTRACT

Comprises a bowl provided with a porous bed of a granular material (1), and means of emptying (3), which can be connected to the pipes of a drain installation; water irrigation device, disincrustant and/or disinfectant to dilute and wash away the stools and for cleaning the device; a grill (4), mounted beneath the bed and having suitable mesh size; a lift-up cover (5) made up of a hollow body provided with diffusing orifices (6) for water, descaling and/or disinfectant product, articulated onto the bowl (1), means (12) for feeding air to the cover (5), for drying the interior of the device; and descaling and/or disinfectant product dispensing device. The lift-up cover (5) adopts a lowered cleaning position in which the water irrigation and/or drying device actuate, and a raised operational position, in which the irrigation device are deactivated and in which the animal can defecate. The device can be installed in unmovable position in a dwelling house or communal area.

4 Claims, 2 Drawing Sheets

SANITARY DEVICE FOR THE DEPOSITION OF DOMESTIC ANIMALS EXCREMENTS

TECHNICAL FIELD OF THE INVENTION

This invention relates to a sanitary device for the stools of household animals, of the type which comprises a bowl provided with a defecation bed made up of a granular material on which the animal defecates, water irrigation means, disincrustant and/or disinfectant to dilute and wash away the stools and for cleaning the device, the bowl being provided at its essentially lower part with emptying means which can be attached to the pipes of a drain installation.

The device of this invention finds particular application in private dwelling houses or in communal areas.

BACKGROUND OF THE INVENTION

Known at present are a wide range of devices for disposing of the stools of household animals, which devices can be installed in the actual house of the owner of the animal or in a private communal area.

Amongst other types, known in the art are devices which comprise a bowl provided with a defecation bed of gravel on which the animal defecates, such as that described in EP-A-0277863.

Also known in the art is the use of means of water irrigation, descaling agent and disinfectant for dilution and washing away of the stools in order to clean the device following use thereof by the animal, and the aforesaid defecation bed being provided with emptying means that can be attached to the pipes of a waste water disposal sewage installation, such as a domestic wastewater installation. Patents WO 97/10705 and ES-A-2034863 make known devices of those characteristics.

Although in practice such devices work correctly, they have the initial disadvantage that their make-up and installation are generally complex, since they must normally be fixed unmovably in one permanent location.

Furthermore, cleaning of the device itself calls for recourse to a manual action of cleaning "in situ", involving necessarily a certain degree of physical contact of the hands with the dirty parts of the device, which involves a second disadvantage, since it is unpleasant and can be a health hazard. The alternative of removing the device to take it to a place where washing is more convenient and without threat to health, for example to an open area, is inconvenient and amounts to another disadvantage.

DESCRIPTION OF THE INVENTION

The object of this invention is a new embodiment of a sanitary device for the defecation of household animals, providing a solution to all the disadvantages described above and benefiting from improved hygiene and convenience.

The device of this invention is essentially characterised in that it is provided with a grill, mounted under the defecation bowl and provided with a sieve designed to allow the dissolved stools to pass but not the material from the bed;

a lift-up cover made up of a hollow body whose lower part is provided with holes for distributing water, disincrustant and/or disinfectant, articulated onto said bowl;

means for feeding warm or cold air to said lift-up cover for drying the interior of the device after it has been washed; and means for dispensing the descaling and/or disinfectant product, all this so arranged that the lift-up cover is designed to take up a lowered cleaning position, covering the bowl, in which the water irrigation and/or drying means for the device can be activated, and a raised operational position, in which said irrigation means are deactivated and in which the animal can defecate, it being possible to fit the device movably in a dwelling or in a communal area.

According to another characteristic of the invention, the device includes valve means for feed to the irrigation means, designed to cut off that feed when the lift-up cover is in its raised position.

In an alternative form of embodiment of the invention, the device can be adapted to a conventional sink, the irrigation means then being formed by the tap of the sink itself, and the products carried away during washing being poured in the sink drain.

According to another form of embodiment, the lift-up cover is driven electrically.

BRIEF DESCRIPTION OF THE DRAWINGS

There follows below a detailed description of preferred, though not exclusive, forms of embodiment of this invention, for a better understanding of which some drawings are attached, provided merely by way of non-restrictive example, in which.

DETAILED DESCRIPTION OF THE DRAWINGS

Figure 1:
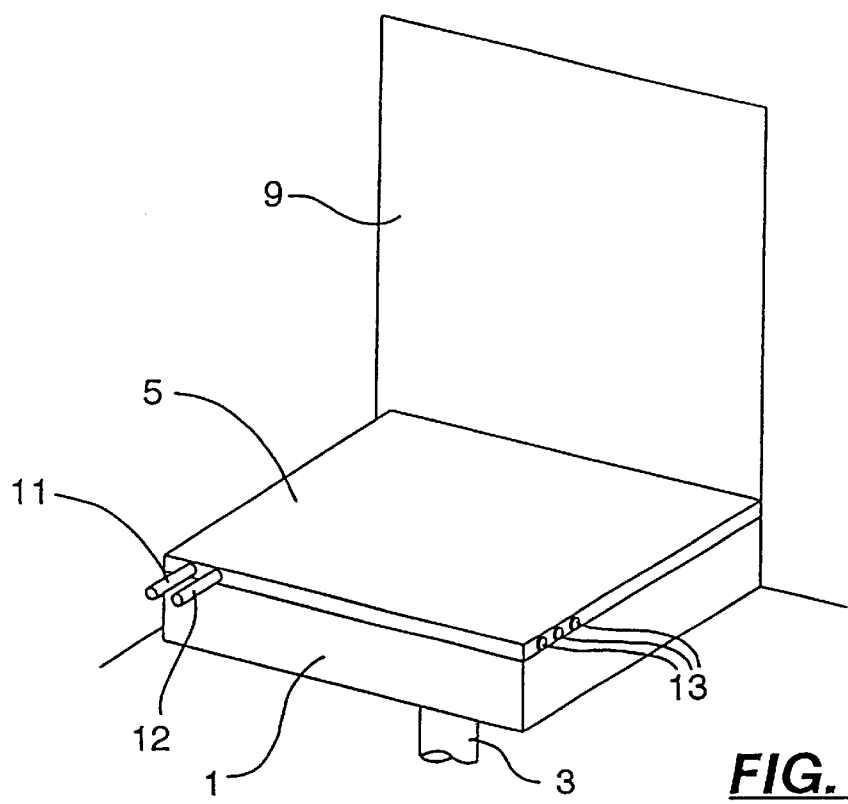
FIG. 1 is a perspective view of a first form of embodiment of the device of the invention, with its cover in its lowered cleaning position.
Figure 2:
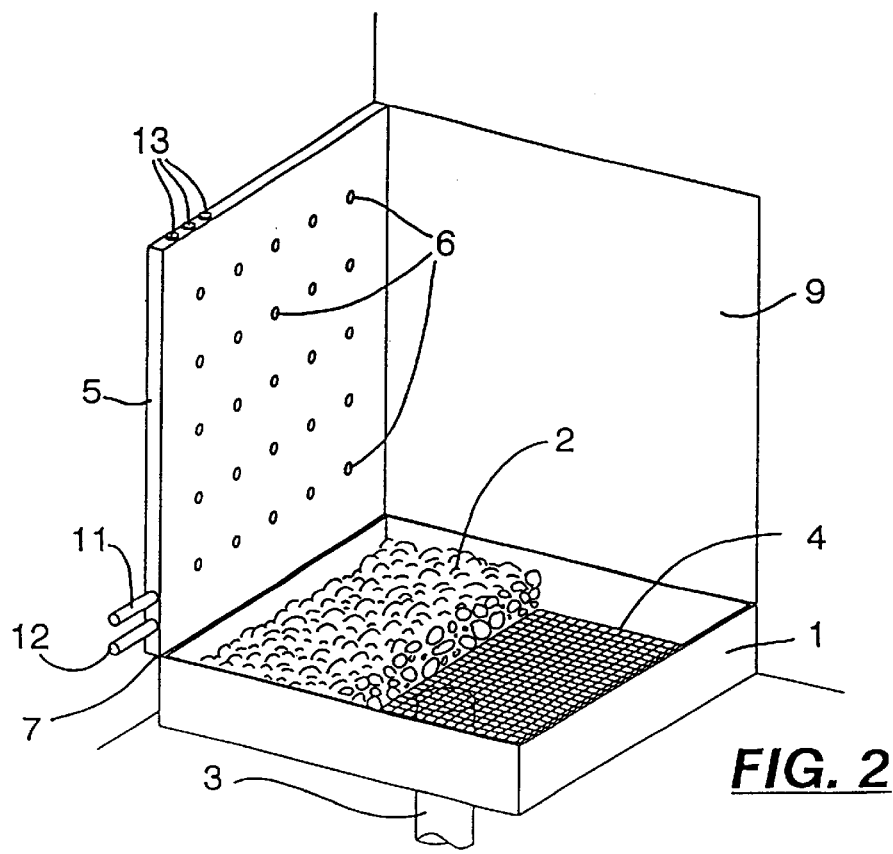
FIG. 2 is a view similar to that of FIG. 1, but with the cover in its raised operational position.
Figure 3:
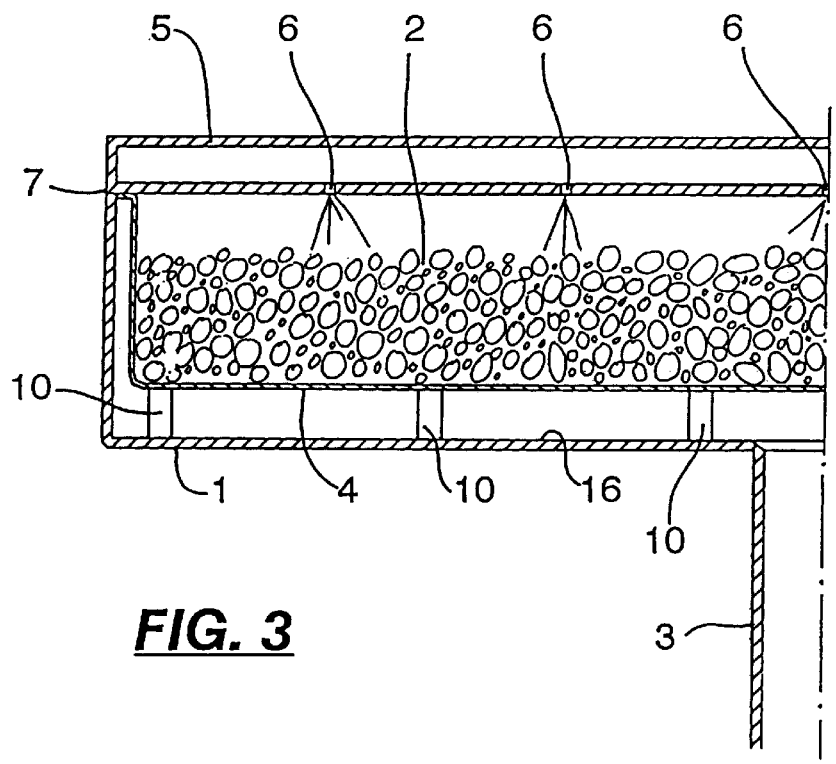
FIG. 3 is a section view of the device of FIG. 1.

In said drawings it can be seen that, according to a first form of embodiment shown in particular in FIGS. 1 to 3, the sanitary device of the invention for the defecation of household animals is made up of a plate 1, essentially parallelepiped and open at the top, the interior of which is fitted with a grill 4, preferably removable, on which has been deposited a bed of a granular material 2, such as river gravel, sand or small pieces of synthetic plastic material.

In the case of cats, the granular material 2 preferred for the defecation bed is of a plastic material such as polypropylene or the like, supplied in small pieces or grains, preferably coloured and without shine. In this case, the grains can be made from reuse of plastic materials and have a maximum dimension not exceeding 3 mm, for which reason the grill 4 must have a mesh size of less than 3 mm.

In any case, the mesh of the grill is such that it does not allow the granular material 2 of the defecation bed above it to pass through. The grill rests on the base 16 of the bowl 1 by means of supporting legs 10 (FIG. 3)

The bottom of the device is provided with a drainage pipe 3 for eliminating the waste by emptying the device.

The drainage pipe is designed to be connected to a household drainage installation and/or to the sewerage network.

At one of its edges 7, the device has an articulated lift-up cover 5 which is hollow inside and is provided with a supply of water 11 and a supply of warm air 12, together with a plurality of diffuser orifices 6.

For the water feed 11, water can penetrate the lift-up cover along with a certain dosage of descaling and/or disinfectant products, in order to dilute and wash away the stools and clean the device, while through the air supply ducts 12 there can penetrate air which has been previously heated by conventional air-heating means, not shown in the drawings. Said heating means can take the known form of a heating element beside a suitable fan.

The device can thus be used in two positions: an operational position in which the lift-up cover 5 is raised and in which the supply of water 11 and of air 12 are deactivated, so that the animal can defecate or urinate, as shown in FIG. 2, and a cleaning position in which the lift-up cover 5 is lowered, as shown in FIGS. 1 and 3.

In this last cleaning position, water with descaling and/or disinfectant product can enter the lift-up cover 5 and be evacuated through the orifices 6, in order to drag the stools through the grill for elimination via the drainage pipe 3. Warm air is then fed into the device in order to dry it.

Cleaning of the device can thus be carried out automatically at its actual location, without any need for the hands of a person to come into contact with the dirty parts of the device.

FIGS. 1 and 2 show that the device is provided with a vertical, rectangular plate 9, positioned adjacent to the lift-up cover 5 when the latter is in its raised position, thereby forming means for the walls on which the device is situated clean and for supporting the leg of the animal, in the case of a dog, in which case the dog will tend to urinate with its leg lifted towards said plate.

Preferably, the lift-up cover 5 is driven by electrical means, through controls 13 designed to actuate raising or lowering of the. lift-up cover, washing with water, or with water and disinfectant, or with water and descaling agent, and drying of the device.

Preferably, the device includes valve means, not shown, designed to cut off supplies of water and air when the device is in its operational position.

Optionally, the raising and lowering of the lift-up cover 5 can be driven by motor means, which for the purposes of greater clarity have not been shown in the drawings.

Figure 4:
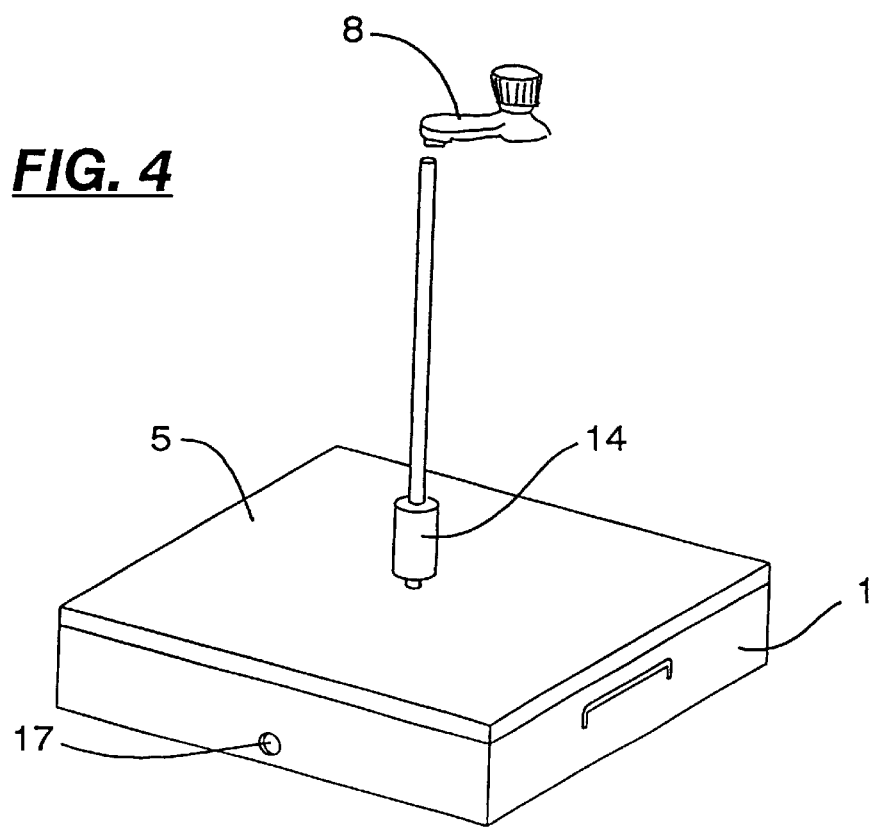
FIG. 4 is a perspective view of a second form of embodiment of the device of the invention.

According to a second embodiment, shown in FIG. 4, the device is adaptable to a conventional sink, the irrigation supply 11 being constituted of a tubing, connected to sink tab 8, and having a disincrustant dosing pump 14. In this case, the device is provided with a hole 17 for draining the waste to the drain of the sink.

The edges 7 of the grill 4 can be optionally provided with a protection, such as sleeves, made from a material different from that of the grill 4, which is not illustrated in drawings.

The nature of the invention having been described sufficiently, together with the way of implementing it, it is noted that all that does not alter, change or modify its fundamental principle can be subject to changes of detail.

In this respect, it should be understood that although it has been stated that this invention is mainly applicable for household or private uses, its use in public areas also lies within the scope of the inventive concept.

What is claimed is:

1. Sanitary device for the stools of household animals, comprising:

a bowl (1) provided with a porous defecation bed made up of a granular material (2) on which the animal defecates;

an irrigation supply for supplying a liquid to dilute and wash away the stools and for cleaning the device;

an outlet drain attachable to pipes of a drain installation;

a grill (4) mounted under the defecation bed and provided with a sieve to allow the dissolved stools to pass but not the material from the bed;

a lift-up cover (5) including a hollow body having a lower part provided with holes (6) for distributing the liquid articulated onto said bowl (1);

an air supply (12) for feeding warm or cold air to said lift-up cover (5) for drying the interior of the device after it has been washed; and means for dispensing the liquid wherein the lift-up cover (5) is designed to take up a lowered cleaning position, covering the bowl, in which the irrigation supply and/or air supply for the device can be activated, and a raised operational position, in which said water irrigation supply and said air supply are deactivated and in which the animal can defecate, it being possible to fit the device movably in a dwelling or in a communal area.

2. Device as claimed in claim 1, further comprising a valve for feed to the irrigation supply, designed to cut off that feed when the lift-up cover (5) is in its raised position.

3. Device as claimed in claim 1 or claim 2, wherein said bed is adapted to rest in a sink, the irrigation supple then being formed by the tap of the sink (8), and the products carried away during washing being poured in the sink drain.

4. Device as claimed in claim 1 or claim 2, wherein the lift-up cover (5) is driven electrically.

* * * * *